(12) United States Patent
Dholakiya

(10) Patent No.: US 10,191,291 B2
(45) Date of Patent: Jan. 29, 2019

(54) MAGNIFIED-LOOK DIAMOND JEWELRY

(71) Applicant: H.K. Designs Inc., New York, NY (US)

(72) Inventor: Hasu Dholakiya, New York, NY (US)

(73) Assignee: H.K. DESIGNS INC., New York, NY (US)

(*) Notice: Subject to any disclaimer, the term of this patent is extended or adjusted under 35 U.S.C. 154(b) by 0 days.

(21) Appl. No.: 15/492,068

(22) Filed: Apr. 20, 2017

(65) Prior Publication Data
US 2018/0307050 A1 Oct. 25, 2018

(51) Int. Cl.
A44C 17/02 (2006.01)
G02B 27/02 (2006.01)
G02B 1/11 (2015.01)
G02B 1/18 (2015.01)
G02B 1/14 (2015.01)
G02B 27/00 (2006.01)
G02B 7/02 (2006.01)
A44C 5/00 (2006.01)
A44C 7/00 (2006.01)
(Continued)

(52) U.S. Cl.
CPC ............ G02B 27/027 (2013.01); A44C 5/00 (2013.01); A44C 7/00 (2013.01); A44C 15/005 (2013.01); A44C 17/02 (2013.01); A44C 25/001 (2013.01); G02B 1/11 (2013.01); G02B 1/14 (2015.01); G02B 1/18 (2015.01); G02B 7/025 (2013.01); G02B 27/0006 (2013.01); G02B 27/028 (2013.01)

(58) Field of Classification Search
CPC .. A44C 17/0283; A44C 17/0291; A44C 17/02
See application file for complete search history.

(56) References Cited

U.S. PATENT DOCUMENTS 1,325,315 A * 12/1919 Cresse .................. A44C 17/02
63/15
2,450,620 A * 10/1948 Speicher ............. A44C 17/006
29/10
(Continued)

FOREIGN PATENT DOCUMENTS

EP 1760547 A2 * 3/2007 ............ A44C 17/02
FR 960 494 A 4/1950
(Continued)

OTHER PUBLICATIONS

Extended European Search Report and Search Opinion dated Feb. 21, 2018 in corresponding European Patent Application No. EP 17190048.3 (total 8 pages).

Primary Examiner — Emily M Morgan
(74) Attorney, Agent, or Firm — Ostrolenk Faber LLP

(57) ABSTRACT

A jewelry setting has a magnifying lens in a lens holder for supporting the magnifying lens. A precious stone arrangement is supported by a precious stone setting for supporting the precious stone arrangement below the magnifying lens, at such position relative to the magnifying lens as to produce a magnified image of the precious stone arrangement at a top surface of the magnifying lens. A mechanical coupling is configured to couple the precious stone setting to the lens holder. The setting can be implemented as any type of jewelry item, e.g. a finger ring, a necklace, a pendant and the like.

17 Claims, 7 Drawing Sheets

(51) Int. Cl.
  *A44C 15/00* (2006.01)
  *A44C 25/00* (2006.01)

(56) References Cited

U.S. PATENT DOCUMENTS

| | | | | |
|---|---|---|---|---|
| 2,775,878 A * | 1/1957 | Eichhorn | ............... | A44C 17/02 63/15 |
| 5,015,523 A * | 5/1991 | Kawashima | ..... | B29D 11/00009 427/162 |
| 6,244,772 B1 * | 6/2001 | Ruchonnet | ......... | A44C 17/0291 401/195 |
| 6,324,868 B1 * | 12/2001 | Chen | ................. | A44C 17/0291 63/1.14 |
| 6,324,869 B1 * | 12/2001 | Vanlioglu | .......... | A44C 17/0291 63/26 |
| 2004/0237585 A1 | 12/2004 | Golden et al. | | |
| 2006/0000236 A1 * | 1/2006 | Chan | ....................... | A44C 9/00 63/27 |
| 2007/0157665 A1 * | 7/2007 | Lai | ......................... | A44C 17/00 63/26 |
| 2012/0103015 A1 * | 5/2012 | Graham | ............... | A44C 9/0061 63/15 |
| 2013/0312458 A1 * | 11/2013 | Flatow | .................. | A44C 25/00 63/33 |
| 2014/0265083 A1 * | 9/2014 | Bach | .................... | A44C 17/043 269/3 |
| 2016/0066662 A1 * | 3/2016 | Rosenberg | ............... | A44C 9/00 428/13 |
| 2017/0172265 A1 * | 6/2017 | Leuz | .................. | A44C 17/0283 |
| 2017/0231336 A1 * | 8/2017 | Disinger | .................. | A44C 1/00 63/1.13 |
| 2018/0000208 A1 * | 1/2018 | Bove | .................... | A44C 17/0291 |

FOREIGN PATENT DOCUMENTS

| | | | | |
|---|---|---|---|---|
| FR | 2309808 A1 * | 11/1976 | ........... | A44C 9/0053 |
| FR | 3002653 A1 * | 8/2014 | ............ | G02B 7/025 |
| JP | 2003-289918 A | 10/2003 | | |
| JP | 2008-279194 A | 11/2008 | | |
| JP | 2009-125417 A | 6/2009 | | |
| JP | 2012-161564 A | 8/2012 | | |
| WO | WO-2011031258 A1 * | 3/2011 | ........... | A44C 9/0061 |

* cited by examiner

MAGNIFIED-LOOK DIAMOND JEWELRY

This is a continuation in part of U.S. patent application Ser. No. 29/600,165, filed Apr. 10, 2017 in the name of Hasu DHOLAKIYA and entitled PRECIOUS STONE JEWELRY SETTING, the entirety of which contents are expressly incorporated herein by reference.

BACKGROUND OF THE INVENTION

The present invention is generally directed to diamond jewelry and, more particularly, to a diamond jewelry setting that provides to diamond jewelry a magnified look and appearance.

Billions of dollars of diamond jewelry are sold yearly. When it comes to purchasing diamond jewelry, the four C's are of utmost importance. As is well known, the four C's stand for Clarity, Color, Cut and the all-important Carat weight. One of the first impressions that one derives from diamond jewelry is the size of the centrally set diamond. For diamonds that are otherwise comparable as to color, cut and clarity, the difference between a 0.25 carat diamond and a 1.00 carat diamond can be a tenfold price differential, even though the diametrical size of a 0.25 carat round diamond is 4.1 mm while that of a 1.00 carat diamond is only about 50% larger, at about 6.4 mm.

In the prior art of the past 150 years, many attempts have been made to create for diamonds a "bigger look." For example, for more than 125 years people have been creating "cluster" diamond arrangements with a larger center diamond that is tightly surrounded by smaller sized diamonds so that, from a distance, the overall diamond arrangement looks like a single "solitaire" diamond of a larger diametrical size, namely that of the cluster.

But still, a cluster diamond arrangements consists of many diamonds and when viewed even at arm's length, the individual diamonds can be made out which detracts from the overall look and appearance. Furthermore, setting many smaller stones around a larger center stone requires specially constructed settings for holding the smaller stones and costly human labor to set the numerous stones that make up the cluster.

Following the same age-old quest of presenting diamond jewelry that conveys the appearance of a diamond larger than it actually is, the present inventor has proceeded with a variant technique that provides that bigger look, while avoiding some of the drawbacks that are associated with attaining that design objective by clustering numerous diamonds together.

SUMMARY OF THE INVENTION

Accordingly, it is an object of the present invention to provide diamond jewelry that features a centrally located diamond that conveys a size appearance much larger than it actually is.

It is another object of the invention to attain a large look diamond appearance in a manner that is inexpensive and yet obtains a truer simulation of a single, large diamond.

The foregoing and other objects of the invention are realized by a jewelry setting that has a magnifying lens in a lens holder for supporting the magnifying lens. A precious stone arrangement is supported by a precious stone setting for supporting the precious stone arrangement below the magnifying lens, at such position relative to the magnifying lens as to produce a magnified image of the precious stone arrangement at a top surface of the magnifying lens. A mechanical coupling is configured to couple the precious stone setting to the lens holder. The setting can be implemented as any type of jewelry item, e.g. a finger ring, a necklace, a pendant and the like.

Preferably, the precious stone arrangement comprises a single diamond, but may be provided as a plurality of diamonds arranged as a cluster. The magnifying lens comprises a plano-convex lens, made of glass or plastic material.

In one embodiment, the mechanical coupling comprises a plurality of spaced prongs. In another embodiment, the precious stone setting comprises a sheet of glass with one or more cut outs for respectively receiving and holding one or more respective diamonds.

The lens holder has an outer shape which can be anyone of: round-shape, pear-shape, heart-shape, oval-shape, square-shape, triangle-shape and rectangular-shape. The precious stone arrangement includes one centrally located diamond that has an outer shape which is one of: round-shape, square-shape, cushion-shape, oval-shape, emerald-shape, pear-shape and marquis-shape. A setting connector may be attached to the jewelry setting and the connector being configured to enable wearing the jewelry setting as anyone of: a bracelet, a necklace, a pendant, an earring and the like.

The magnifying lens is preferably coated with an anti-reflective coating, and also be fingerprint resistant and scratch resistant. The mechanical coupling is provided as a water resistant coupling that does not allow liquid or moisture to enter in a space between the precious stone arrangement and of the magnifying glass. In one embodiment, the mechanical coupling includes a glass tube that connects the precious stone setting to the lens holder. Glue may be used to seal the setting, which can be ultraviolet activated glue.

Other features and advantages of the present invention will become apparent from the following description of the invention which refers to the accompanying drawings.

DETAILED DESCRIPTION OF EMBODIMENTS OF THE INVENTION

Figure 1:
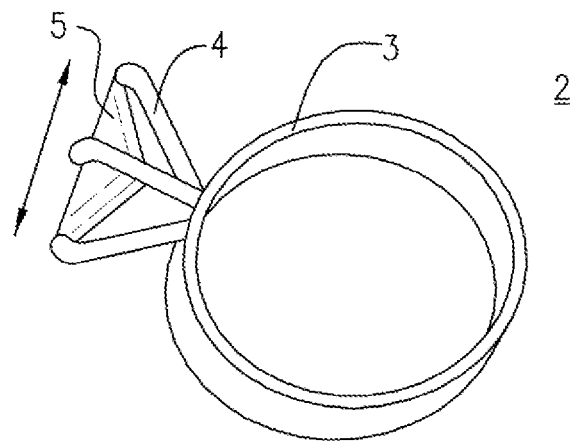
FIG. 1 perspectively shows a conventional engagement ring that holds a single diamond with several prongs.
Figure 1A:
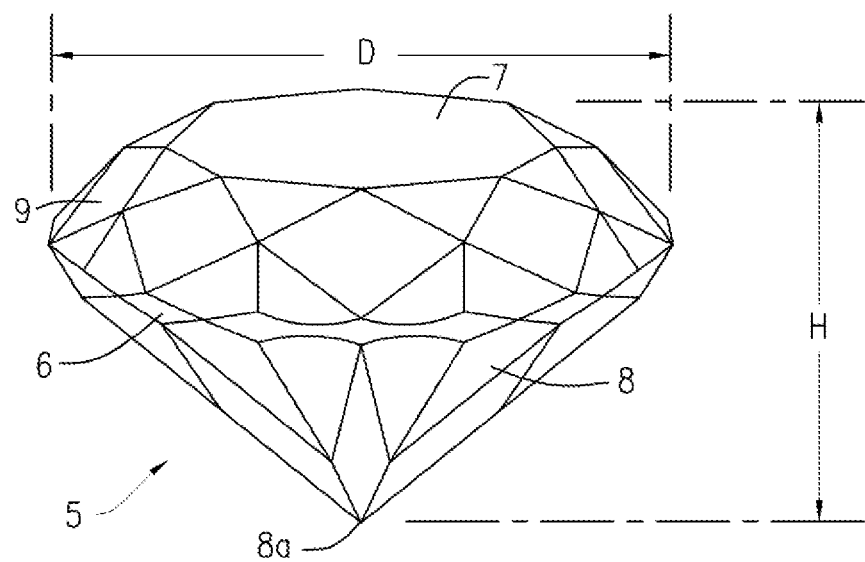
FIG. 1a perspectively shows a conventional round diamond.

For background purposes, initial reference is made to FIG. 1 and FIG. 1a which show an engagement ring 2 with a ring body 3 that can be donned on a finger, supporting a multi-pronged setting 4 that holds in place a conventional round diamond 5. As is well known, a typical round diamond has a diameter "D" which conveys a measure of the "largeness" of the diamond 5. This diamond 5 has a girdle 6, a crown 9 and a table 7. With a pavilion 8 tapering down to the culet 8a. ("H" represents the height of the diamond 5 from the table 7 to the culet 8a.

Figure 2:
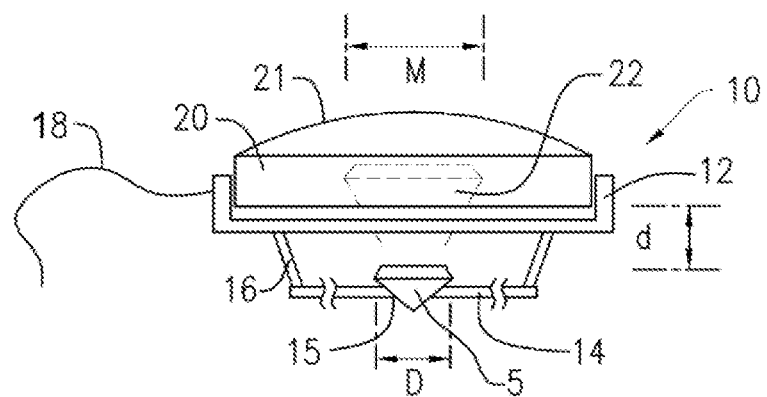
FIG. 2 is a diagram of a jewelry setting that conveys a larger look for a diamond, using a magnifying lens, in accordance with the present invention.

The conceptual and structural aspects of the present invention can be quickly grasped from FIG. 2 which shows a setting 10, including a cup-shaped lens holder 12 which tightly holds a plano-convex magnifying lens 20 and a diamond setting 14 that has a central opening 15 to hold the diamond 5. The setting 14 is mechanically attached by connectors 16 to the underside of the lens holder 12, leaving a well-defined focusing distance "d" between the bottom of the lens 20 and the top ("table") of the diamond 5. Thereby, when viewed from above, the diamond 5 appears to the viewer as a virtual sharp image 22 which is a magnified image 22 of the actual diamond 5 when viewed from the top of the setting.

The setting 10 can be attached to one's clothing or body to make it a wearable item, in the example in FIG. 2, an earring wire 18. However, the element 18 can be instead a chain or a pin or other mechanical means to present the jewelry piece FIG. 2 as either an earring or a pendant or a bracelet or necklace, or any known jewelry piece. Regardless, instead of presenting the true size of the diamond 5, the inventive setting shows an enlarged diamond with an enlarged diameter "m" which can provide an appearance or look that is twice or even several times the size of the actual diamond 5.

Although the embodiment of FIG. 2 shows a gap "d" being provided between the top of the diamond and the bottom of the plano-convex magnifying lens 20, those of skill in the art of optics will appreciate that there lenses available that allow the diamond 5 to be located directly underneath the bottom of the lens 20 and still provide a focused image at the top that is twice or several times as large as the actual diamond. The objective of the invention is nevertheless obtained in that the enlarged image 22 is the image that is perceived when looking at this jewelry. Also, as known to those who are conversed and/or work in the optical field, the top surface 21 of the lens can be coated to reduce the glare or to render it scratch resistant, and the like.

Figure 3:
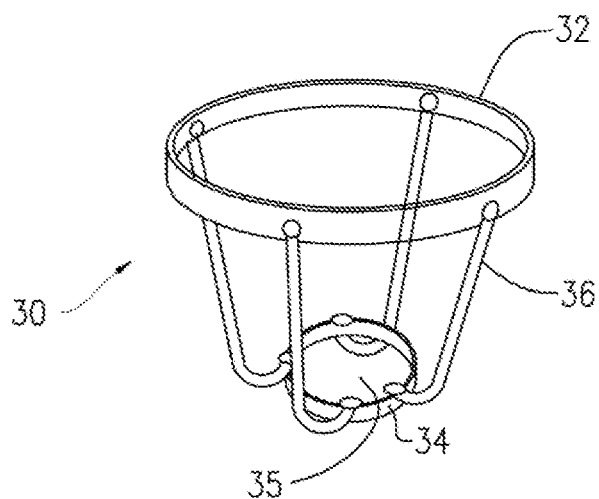
FIG. 3 perspectively and diagrammatically illustrates a setting that supports one or more diamonds under a magnifying lens.
Figure 3A:
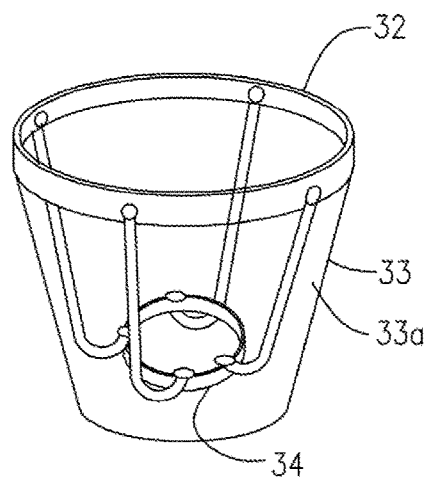
FIG. 3a adds to the embodiment of FIG. 3 a water-resistant container to prevent moisture or condensation within the setting.

In the jewelry setting 30 illustrated in FIG. 3, the band 32 holds the lens 20 (FIG. 2) while a ring-shape setting 34 with an interior 35 sized for the girdle of the diamond 5 receives and firmly supports the diamond. The setting 34 is connected by prongs 36 to the peripheral wall of the lens holder 32, at the desired distance from the bottom of the lens 20. Note that in FIG. 3 the length of the prongs 36 is somewhat exaggerated because typically that top of the table of the diamond 5 would be closer to the bottom of the lens. In FIG. 3a, a transparent tubing 33 surrounds and seals the space between the diamond setting and the lens holder 32, to prevent water entering or condensation forming with the interior space 33a, which is hermetically bounded at the top by the lens 20 and at the bottom by the tube 33.

Figure 4:
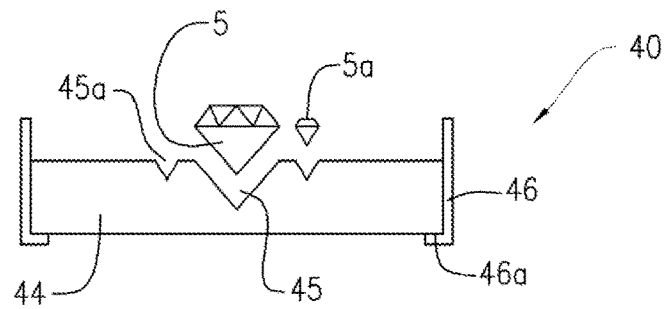
FIG. 4 diametrically illustrates another variation for supporting a diamond below a magnifying lens.

A further embodiment of the invention, shown in FIG. 4, holds the physical diamond 5 in the setting 44, provided as a sheet of clear glass with slits/grooves 45 (and optionally additional slits 45a surrounding the slit 45) which enables the diamond 5 to be set at the center and to be surrounded by smaller stones 5a. The glass setting 44 is held by a support 46 which has an under lip 46a and which can be mechanically fastened by brazing, gluing, etc. to the lens holder 12 of FIG. 2. Indeed, when the diamond 5 is located directly under the lens 20, it is held in place physically from both below and above, which greatly simplifies assembling this piece of jewelry as it avoids the need for jewelers' labor to set "diamonds," a rather laborious and expensive process.

Figure 5:
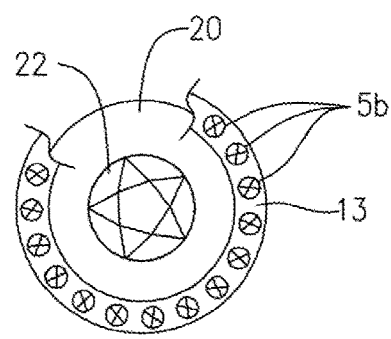
FIG. 5 is a diagram showing a setting that partially conceals the magnifying lens.

From FIG. 3 it might be observed that typically the lens 20 has a diameter which is considerably larger than the diameter of the diamond 5. In accordance with the embodiment of FIG. 5, the lens holder of FIG. 2 is further developed by including, at the top edge thereof, an inwardly bent ring 13 supporting a plurality of auxiliary diamonds 5b that are located on top around and covering the edge of the magnifying lens 20, preferably reaching relatively close to the diamond image 22, which yields further aesthetic advantages.

Further embodiments of the invention can be appreciated from FIGS. 6, 6a, 6b, 6c and 6d. According to FIG. 6, the lens holder 62 has the circular shape as depicted, with an interior, circular opening 63 for the lens (not shown) and a prongs-holder 66 with distal ends 64 that are bent over the physical diamond, in a well-known manner. A chain holder 68 is attached via a connection ring 69 to the body of the lens holder 62, enabling a chain to be threaded through 68 for donning the piece of jewelry that provides the magnified image of the diamond 5, once the lens 20 has been inserted at 63.

Figure 6:
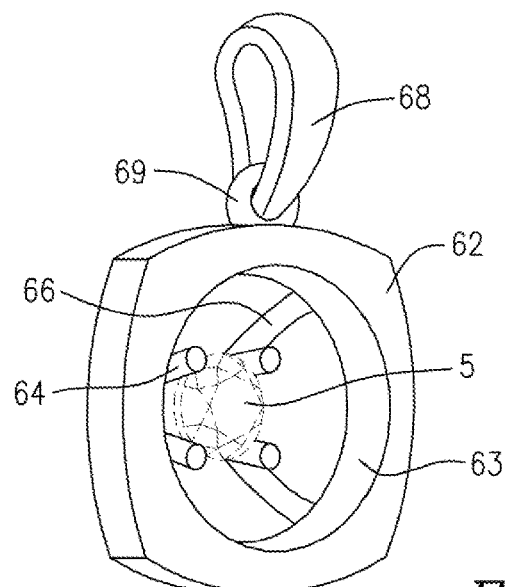
FIG. 6 perspectively illustrates an embodiment of the invention.
Figure 6A:
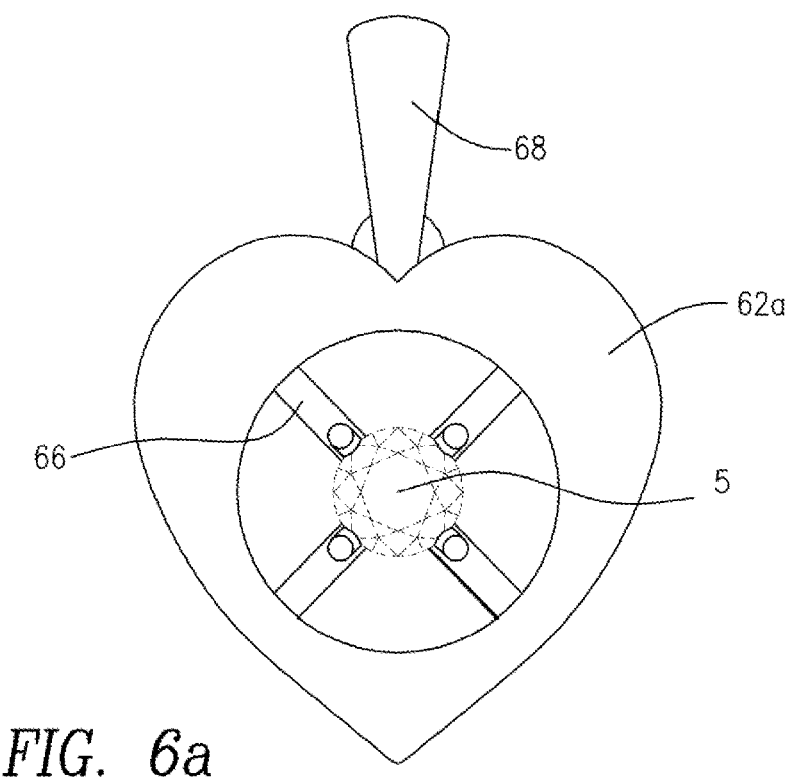
FIG. 6a shows a variation on the jewelry setting of FIG. 6.
Figure 6B:
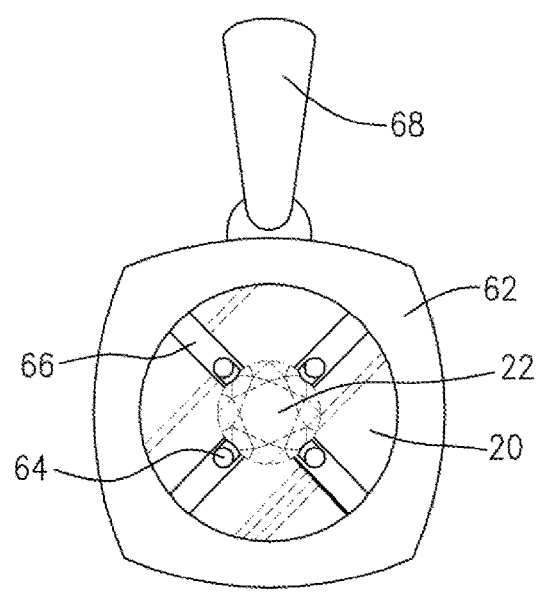
FIG. 6b is a top view of the jewelry setting of FIG. 6.
Figure 6C:
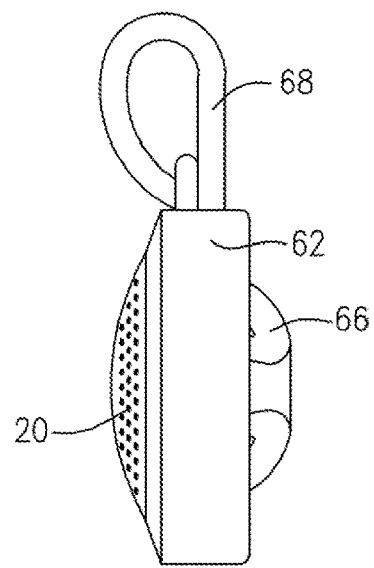
FIG. 6c is a side view of the jewelry setting of FIG. 6.
Figure 6D:
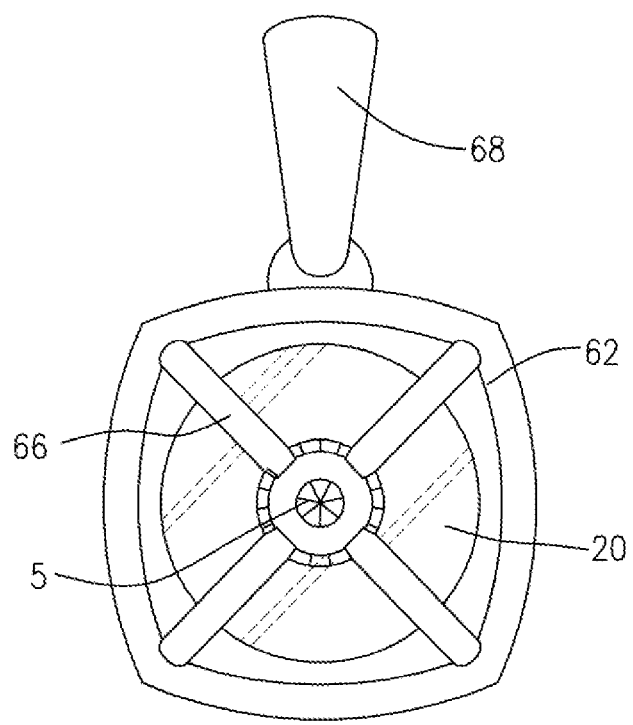
FIG. 6d is a bottom view of the jewelry setting of FIG. 6.

Turning to FIG. 6a, in this embodiment the outer shape of the modified lens holder 62a is heart shaped, but otherwise this embodiment is identical to that of FIG. 6. FIG. 6b shows the jewelry setting of FIG. 6 as a top view including the enlarged diamond image 22 that is provided by the lens 20 and which also shows the prongs and prong ends 66, 64 held to the lens holder 62. FIG. 6c is a side view of FIG. 6 while FIG. 6d provides a bottom view of the embodiment of FIG. 6.

Figure 7:
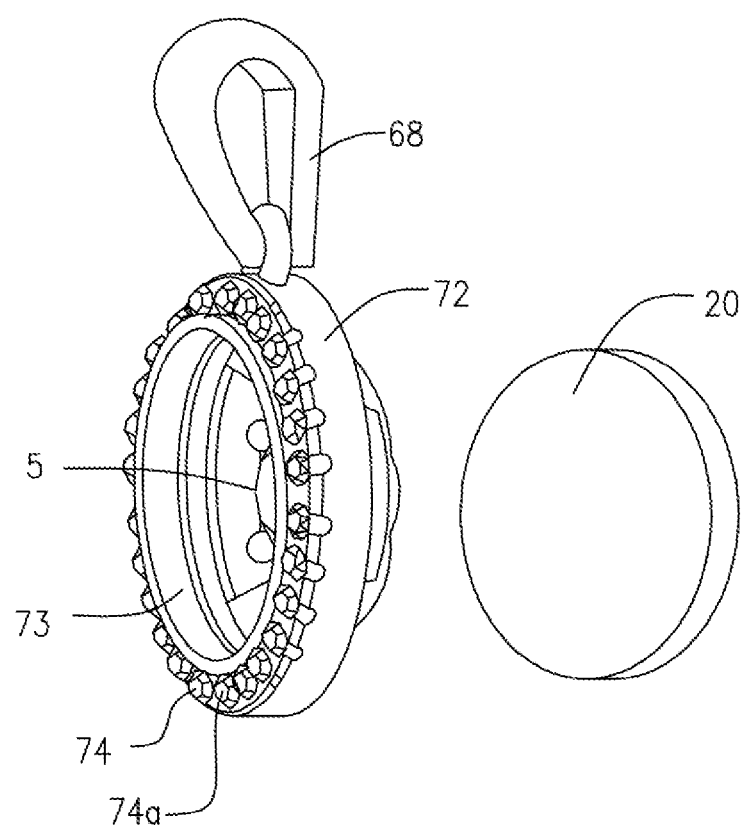
FIG. 7 is a perspective of another embodiment of the present invention in accordance with a further embodiment thereof.

A further embodiment of the invention which is similar to the embodiment of FIG. 6 is depicted perspectively in FIG. 7, which shows the lens 20 secured at the lens opening 73 above the diamond 5. The lens holder 72 is formed with an auxiliary setting 74 for smaller sized diamonds 74a of desired shapes, which may be round diamonds or baguettes and the like, all in well-known manner.

In general, one of skill in the art will immediately realize that the present invention is not limited to settings that provide a magnified look for only round diamonds. Indeed, the physical diamonds that are utilized in the invention can be of any shape including round, emerald cut, oval, pear-shaped, square shaped or an arrangement of those diamonds as in the prior art cluster arrangements and the appearance at the top of the magnifying lens will invariably provide an appearance that can be at least twice and indeed several times the physical size of the actual diamonds or diamond cluster. In other words, the present invention provides the look of jewelry that features what appears to be a one or two carat diamond for the cost of a diamond that may be only a quarter of a carat or even smaller in size.

As to the magnifying lens 20, the same has been described above as being made of glass which, as is known, is a very clear and light transmissive substance. However, the lens can be also fabricated of plastic or other synthetic materials and the shape of the lens can be adjusted according to the rules of optic to provide optimized appearances for the involved jewelry. Similarly, the lens 20 need not be limited to a plano-convex lens and other lens shapes can be utilized including combination of lens, using known optical techniques. Similarly, while in the embodiment of FIG. 4 the diamonds are set in a glass slab, providing a see-through look to the region below the setting, the physical holder can be made of thin, highly polished metal that reflects light upward, similar to a mirror and the like.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A jewelry setting, comprising:
   a magnifying lens having a given diametrical size;
   a band configured to hold and support the magnifying lens;
   a precious stone having a diametrical size substantially smaller than the diametrical size of the magnifying lens and a table surface facing the magnifying lens, said precious stone being located centrally below the magnifying lens, the precious stone being spaced away from the magnifying lens;
   a precious stone setting configured to stationarily support the precious stone directly below the magnifying lens, at such position relative to the magnifying lens as to produce a magnified image of the precious stone at a top surface of the magnifying lens; and
   the precious stone setting being affixed to the band that holds the magnifying lens by a plurality of prongs, each said prong having one end attached to the band and another end attached to a stone setting which physically holds the precious stone.

2. The jewelry setting of claim 1, wherein the precious stone comprises a single diamond.

3. The jewelry setting of claim 1, wherein the jewelry setting comprises and supports a plurality of additional diamonds arranged as a cluster.

4. The jewelry setting of claim 1, wherein in the magnifying lens comprises a plano-convex lens.

5. The jewelry setting of claim 4, wherein the plano-convex lens is made of one of glass and plastic material.

6. The jewelry setting of claim 1, wherein the precious stone setting includes a plurality of spaced prongs that are affixed at one end thereof to the band.

7. The jewelry setting of claim 1, wherein the precious stone setting comprises a sheet of glass with one or more cutouts for respectively receiving and holding one or more respective diamonds.

8. The jewelry setting of claim 1, wherein the band has an outer shape which is one of: round-shape, pear-shape, heart-shape, oval-shape, square-shape, triangle-shape and rectangular-shape.

9. The jewelry setting of claim 1, wherein the precious stone comprises one centrally located diamond that has an outer shape which is one of: round-shape, square-shape, cushion-shape, oval-shape, emerald-shape, pear-shape and marquis-shape.

10. The jewelry setting of claim 1, including a setting connector attached to the jewelry setting and the connector being configured to enable wearing the jewelry setting as one of: a bracelet, a necklace, a pendant, and an earring.

11. The jewelry setting of claim 1, wherein the magnifying lens has a magnifying power to provide the magnified image at least twice as large as the size of the precious stone, when the precious stone is located adjacent a bottom surface of the magnifying lens.

12. The jewelry setting of claim 11, wherein the magnification provided by the magnifying glass is four times the actual image size of the precious stone arrangement.

13. The jewelry setting of claim 1, wherein said magnifying lens is coated with an anti-reflective coating.

14. The jewelry setting of claim 13, wherein the coating is fingerprint resistant and scratch resistant.

15. The jewelry setting of claim 1, wherein the precious stone setting is attached to the band so that a space between the precious stone and of the magnifying glass is water resistant in a manner that does not allow liquid or moisture to enter into said space.

16. A jewelry setting, comprising:
   a magnifying lens having a given diametrical size;
   a band configured to hold and support the magnifying lens;
   a precious stone having a diametrical size substantially smaller than the diametrical size of the magnifying lens and a table surface facing the magnifying lens, said precious stone being located centrally below the magnifying lens, the precious stone being spaced away from the magnifying lens;
   a precious stone setting configured to stationarily support the precious stone directly below the magnifying lens, at such position relative to the magnifying lens as to produce a magnified image of the precious stone at a top surface of the magnifying lens; and
   the precious stone setting being affixed to the band that holds the magnifying lens by a plurality of prongs, each said prong having one end attached to the band and another end attached to a stone setting which physically holds the precious stone, including a glass tube that connects the precious stone setting to the lens holder.

17. The jewelry setting of claim 16, wherein glue is used to attach the lens to the jewelry setting.

* * * * *